US010594127B2

(12) United States Patent
Portillo Gallego (10) Patent No.: US 10,594,127 B2
(45) Date of Patent: Mar. 17, 2020

(54) SEALANT FILLED CABLE GLAND

(71) Applicant: Thomas & Betts International LLC, Wilmington, DE (US)

(72) Inventor: Jesus Ricardo Portillo Gallego, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 16/164,300

(22) Filed: Oct. 18, 2018

(65) Prior Publication Data
US 2019/0115743 A1    Apr. 18, 2019

Related U.S. Application Data

(60) Provisional application No. 62/573,859, filed on Oct. 18, 2017.

(51) Int. Cl.
*H02G 15/04* (2006.01)
*H02G 15/013* (2006.01)
(Continued)

(52) U.S. Cl.
CPC .......... *H02G 15/04* (2013.01); *H02G 3/0641* (2013.01); *H02G 3/0675* (2013.01); *H02G 15/007* (2013.01); *H02G 15/013* (2013.01)

(58) Field of Classification Search
CPC .... H02G 15/04; H02G 3/0675; H02G 3/0641; H02G 15/007; H02G 15/013
(Continued)

(56) References Cited

U.S. PATENT DOCUMENTS 4,549,755 A * 10/1985 Kot ...................... H02G 3/0658
174/51
4,590,329 A * 5/1986 Potochnik .............. H01R 13/59
174/76
(Continued)

FOREIGN PATENT DOCUMENTS

GB        2244388 A      11/1991

OTHER PUBLICATIONS

International Search Report and Written Opinion issued in corresponding international application No. PCT/US2018/056504, dated Feb. 25, 2019, 7 pp.

*Primary Examiner* — Sherman Ng
(74) *Attorney, Agent, or Firm* — Taft Stettinius & Hollister LLP; J. Bruce Schelkopf (57) ABSTRACT

A cable gland for providing strain relief and sealing for a cable that can be coupled to a device. The cable gland includes a sealing gland having a sealant. Upon assembly of the cable gland, the sealing gland is compressed in a manner that can releases, or otherwise can facilitate the displacement of, the sealant about an interface between a portion of the cable and the sealing gland, and/or into spaces between exposed insulative jackets and/or conductors of the cable. The sealant can include a curable viscous sealant that is housed within a package of the sealing gland, the package being configured to rupture upon compression of the sealing gland. Alternatively, the sealant can be a malleable sealant material that can be pressed or otherwise displaced to form a seal between the sealing gland and cable and/or into the spaces between exposed insulative jackets and/or conductors of the cable.

20 Claims, 5 Drawing Sheets

(51) Int. Cl.
*H02G 15/007* (2006.01)
*H02G 3/06* (2006.01)

(58) Field of Classification Search
USPC .......................................................... 174/653
See application file for complete search history.

(56) References Cited

U.S. PATENT DOCUMENTS

| | | | |
|---|---|---|---|
| 4,662,692 A | | 5/1987 | Uken et al. |
| 4,692,562 A | * | 9/1987 | Nattel ................. H02G 15/013 |
| | | | 174/653 |
| 5,015,804 A | * | 5/1991 | Nattel .................... H02G 3/088 |
| | | | 174/667 |
| 5,301,959 A | | 4/1994 | Gould |
| 5,310,963 A | | 5/1994 | Kennelly |
| 5,596,176 A | | 1/1997 | Everitt |
| 6,227,900 B1 | | 5/2001 | Heise |
| 6,244,897 B1 | | 6/2001 | Shinozaki |
| 6,812,406 B2 | | 11/2004 | Hand |
| 7,014,502 B2 | | 3/2006 | Rasmussen |
| 7,781,685 B2 | | 8/2010 | Bartholoma et al. |
| 8,581,120 B2 | | 11/2013 | Winship |
| 8,791,376 B2 | | 7/2014 | Endt et al. |
| 8,872,027 B2 | | 10/2014 | Proud |
| 9,484,133 B2 | | 11/2016 | Proud |
| 9,640,965 B1 | | 5/2017 | Long et al. |
| 2007/0163799 A1 | | 7/2007 | Barnhard et al. |
| 2011/0259637 A1 | | 10/2011 | Winship |
| 2013/0112475 A1 | | 5/2013 | Magno, Jr. et al. |
| 2014/0030903 A1 | * | 1/2014 | Magno ................. H02G 15/046 |
| | | | 439/279 |

* cited by examiner

FIG. 5

SEALANT FILLED CABLE GLAND

CROSS REFERENCE TO RELATED APPLICATIONS

The present application claims the benefit of U.S. Provisional Patent Application Ser. No. 62/573,859, filed Oct. 18, 2017, which is incorporated herein by reference in its entirety.

BACKGROUND

Embodiments of the present application generally relate to cable glands. More particularly, but not exclusively, embodiments of the present application relate to cable glands that provide a sealant for protection of cables employed therein and the device to which the cable gland is attached.

Cable glands can be used to provide strain relief for cables that are attached to structures or devices (collectively referred to herein as "devices"). More specifically, at least certain types of cable glands can be structured to be connected to both cables and devices in a manner that can at least assist in retaining a connection between the cable and the device, including assisting in preventing the cable from being pulled away, and/or being disconnected, from the device.

With at least certain types of devices, at least the opening thorough which the cables can pass through the cable gland and into the device can be a source for potential hazard for at least the device, the surrounding environment, adjacent components, and/or operators. For example, such an opening can be provide an area for debris, humidity, and/or water, among other items, to enter into an interior area of the device. Yet, with at least certain types of components, such as, for example, electrical equipment, including switch devices, among other devices and electrical equipment, the presence of such debris and/or moisture can enhance the potential for undesirable sparking, which can trigger a fire or explosion within the device. Further, such an opening into the device through can provide a passage for air that can fuel such a fire, as well as for an area for flames associated with the fire to pass out from the interior area of the device.

Traditional attempts at sealing cable glands are often both labor intensive and involve application of a relatively high degree of installation expertise. Accordingly, there remains a need for further contributions in this area of technology.

BRIEF SUMMARY

An aspect of the present application is a cable gland that can include a gland body having a cavity, a retaining nut that is configured for selective coupling to a first end of the gland body, a gland nut that is configured for selective coupling to a second end of the gland body, and a sealing gland. The sealing gland can comprise a bushing body and a sealant, the bushing body having a bore that is in fluid communication with the cavity. The bushing body can be configured to be in a compressed state by a coupling of the gland nut to the gland body. The sealant can be configured for displacement into a portion of the bore upon the bushing body being in the compressed state.

Another aspect of an embodiment of the present application is a cable gland that can include a gland body having a cavity that extends between openings at opposing ends of the gland body, a retaining nut that can be configured for a threaded engagement with a first end of the gland body, a gland nut that can be configured for a threaded engagement with a second end of the gland body, and a sealing gland. The sealing gland can comprise a bushing body, a package, and a sealant. The bushing body can have a bore that is in fluid communication with the cavity. Additionally, the sealant can be at least temporarily contained within at least a portion of the package. Further, the package is configured to rupture upon compression of the bushing body.

Additionally, an aspect of an embodiment of the present application is a cable gland that can include a gland body that can have a wall that defines a cavity that extends between openings at opposing ends of the gland body. The wall can include a first male thread at a first end of the gland body, and a second male thread at a second end of the gland body. Additionally, the gland body can further comprise a protruding member that outwardly extends from the wall at a midsection of the gland body, the protruding member having a shape configured for mating engagement with a tool. The cable gland can also include a retaining nut that has an internal thread that is configured for a threaded engagement with the first male thread of the gland body. The retaining nut can also have an outer a shape that is configured for mating engagement with a tool. Additionally, the cable gland can include a gland nut that has an inner thread that is configured for a threaded engagement with the second male thread of the gland body. Further, the gland nut can also have an outer a shape configured for mating engagement with a tool. The cable gland can also include a sealing gland having a bushing body, a package, and a sealant. The bushing body has a bore that is in fluid communication with the cavity of the gland body. The sealant can at least temporarily be contained within at least a portion of the package. Further, the package can be configured to rupture upon compression of the bushing body.

Another aspect of an embodiment of the present application is a cable gland that can include a gland body that extends between a first open end and a second open end and that can accommodate passage there-through of a cable having a plurality of conductors, a gland nut attachable to the gland body from the second open end, and a sealing gland that can have a rupturable package containing a sealant and/or a malleable sealant material. Upon tightening of the gland nut onto the gland body and compressing the cable placed therewithin, the rupturable package can rupture, or the malleable sealant can be pressed, so that sealant is spread around the cable and between the conductors so as to provide a sealing for environmental protection These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
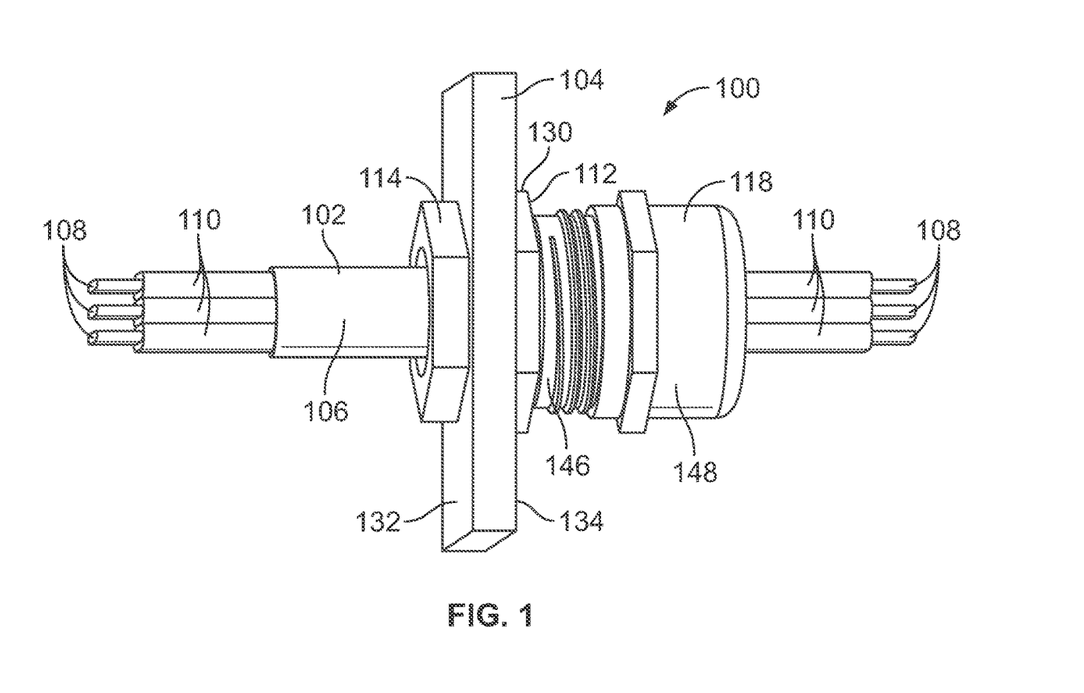
FIG. 1 illustrates a side perspective view of an exemplary cable gland according to an illustrated embodiment of the subject application coupled to a portion of a device.

FIG. 1 illustrates a side perspective view of an exemplary cable gland 100 according to an illustrated embodiment of the subject application coupled to a portion, namely a wall 104, of a device. The cable gland 100 is configured to couple or secure one or more electrical cables or wires 102 (collectively referred to herein as "cable") to a device, such as, for example, an electrical device, as well provide a seal around and/or between at least a portion of the cable 102 that is within the cable gland 100. Moreover, according to certain embodiments, the cable gland 100 is configured to provide strain relieve to the cable 102, as well as provide sealing for environmental protection of the cable 102 and/or the device. For at least purposes of illustration, FIG. 1 shows the cable gland 100 mounted to a wall 104 of the device such that the cable gland 100 securely abuts opposing sides 132a, 132b of the wall 104. The cable gland 100 can be made out of one or more materials having suitable properties for an associated application, including strength, weight, and rigidity, among other suitable properties.

As seen in FIG. 1, according to certain embodiments, the cable 102 can include an outer jacket 106 that defines a cavity for one or more conductors 108 of the cable 102. As also shown in FIG. 1, according to certain embodiments, each of the conductors 108 can be further positioned within an insulative jacket 110, such as, for example, an insulative jacket 110 that can attempt to electrically isolate the conductors 108 from other conductors 108 in the cable 102. The conductors 108 can be constructed from a variety of materials, such as, for example, electrically conducive material, including, but not limited to, copper and aluminum, among others.

Figure 2:
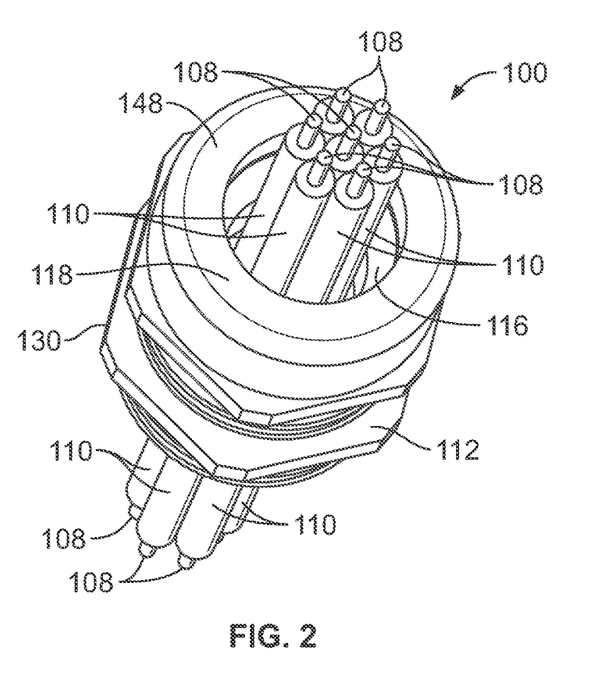
FIG. 2 illustrates a front side perspective view of the cable gland shown in FIG. 1.
Figure 3:
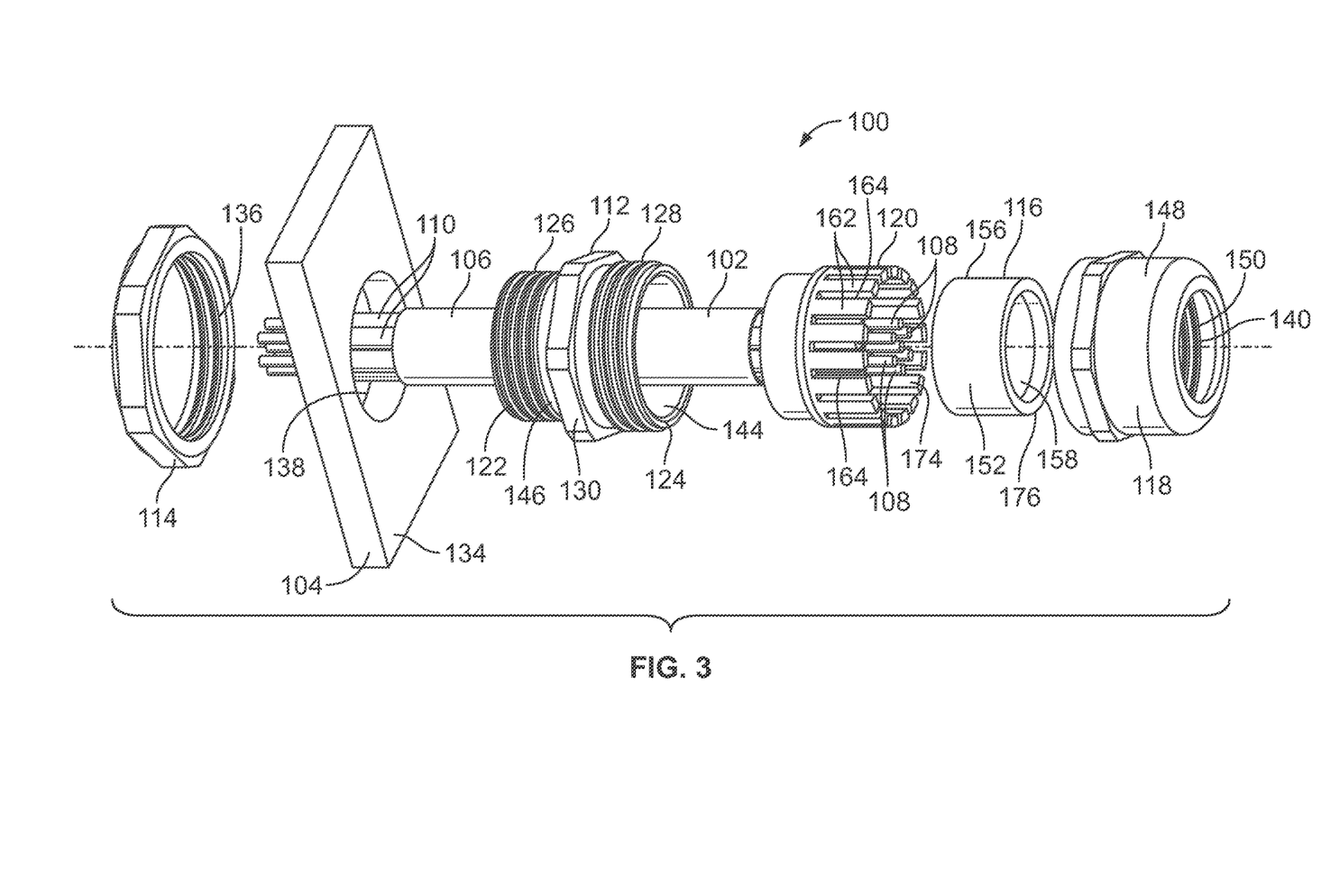
FIG. 3 illustrates an exploded side view of an embodiment of the exemplary cable gland shown in FIG. 1 with a wall of a device.

As shown in at least FIGS. 1-3, according to certain embodiments, the cable gland 100 includes a body portion or gland body 112, a retaining nut 114, a sealing gland 116, and a gland nut 118. Optionally, according to certain embodiments, the cable gland 100 can also include an insert 120. The gland body 112, gland nut 118, and retaining nut 114 can be constructed from a variety of materials, including, but not limited to, metal.

The gland body 112 has a wall 146 that can extend between a first open end 122 and a second open end 124 of the gland body 112. Additionally, the wall 146 of the gland body 112 can include a first external male thread section 126 that is formed about the first open end 122, and a second external male thread section 128 formed about the second open end 124. A protruding member 130 can outwardly extend from, as well as extend transversely around, the wall 146 at a location between at least the first and second external male thread sections 126, 128. According to certain embodiments, the outwardly protruding member 130 is configured for mating engagement with a tool, such as, for example, has a generally hexagonal configuration, and is positioned approximately at the middle of the gland body 112. Additionally, the wall 146 and/or gland body 112 can have a variety of different shapes, including, for example, being generally cylindrically shape. Further, an inner side(s) of the wall 146 can define a cavity 134 that extends between opposing openings of the first and second open ends 122, 124 of the gland body 112 that is sized to receive placement of at least a portion of the cable 102, the sealing gland 116, and/or the insert 120.

The retaining nut 114 extends between a first open end 122 and a second open end 124 of the retaining nut 114, and includes an internal female thread 136 formed on an inner surface of the retaining nut 114 that is configured to threadingly engage and mate the first external male thread section 126 of the gland body 112. According to certain embodiments, the retaining nut 114 has a generally cylindrical shape. Additionally, at least a portion of an outer surface of the retaining nut 114 can be configured for a mating engagement with a tool that can assist in securing the retaining nut 114 to the gland body 112, and, moreover, secure the cable gland 100 to the device. For example, the outer portion of the retaining nut 114 can have a generally hexagonal shape that is configured for mating engagement with a wrench or ratchet socket, among other tools. According to such an embodiment, when the gland body 112 is positioned within an opening 138 (FIG. 3) in the wall 104 of the device such that the first and second external male thread sections 126, 128 are positioned on opposing sides 132a, 132b of the wall 104 (FIG. 1) and the internal female threads 136 of the retaining nut 114 are matingly engaged with the first external male thread section 126, one or both of the retaining nut 114 and the gland body 112 can be rotated in a manner that brings the retaining nut 114 into closer proximity to the outwardly protruding member 130 of the gland body 112. Such relative displacement of the retaining nut 114 into closer proximity to the outwardly protruding member 130 can facilitate the cable gland 100 being securely pressed against opposing sides 132a, 132b of the wall 104 in a manner that can secure the cable gland 100 to the wall 104 and/or device.

The gland nut 118 includes an internal female thread 140 formed on an inner surface of the gland nut 118 that is configured to threadingly engage the second external male thread section 128 of the gland body 112. The gland nut 118 extends from a first open end 122 to a second open end 124 of the gland nut 118. The first open end 122 can include an opening 142 that is sized to accommodate placement of at least a portion of the gland nut 118 about at least the second external male thread section 128 of the gland body 112. The second open end 124 can include an opening 144 having a size, such as, for example, diameter, that is smaller than a corresponding size of the opening 142 at the first open end 122 such that the opening 144 at the second open end 124 can at least assist in retaining components of the cable gland 100, such as, for example, the sealing gland 116, at least partially within the cavity 134 of the gland body 112 and/or within the gland nut 118. A wall 148 of the gland nut 118 can also define an inner aperture 150 that is positioned to, when the gland nut 118 threadingly engages the second external male thread section 128 of the gland body 112, be in fluid communication with the cavity 134 of the gland body 112 so as to accommodate passage of the cable 102 through the gland nut 118, including through the first and second openings 142, 144 of the gland body 112.

Similar to the retaining nut 114 and the gland body 112, an outer portion of the gland nut 118 can be configured for mating engagement with a tool, such as, for example, have an outer hexagonal shape. Thus, when assembling the cable gland 100, the retaining nut 114 and gland nut 118 and can each be moved, or rotated, about the respective first and second external male thread section 126, 128 of the gland body 112 such that the retaining nut 114 and gland nut 118 are axially moved towards at least the protruding member 130 of the gland body 112.

With respect to embodiments that include an insert 120, at least a portion of the insert 120 can, when the cable gland 100 is assembled, be linearly positioned at least between the gland body 112 and the gland nut 118. Additionally, a portion of the insert 120 can be designed to engage within the gland body 112. Further, the insert 120 can be configured to accommodate the sealing gland 116 therewithin, and to provide a mechanism to uniformly compress the sealing gland 116 as the gland nut 118 tightens onto the gland body 112 during installation. While the insert 120 can be constructed from a variety of materials, according to the illustrated embodiment the insert 120 is constructed from plastic.

The sealing gland 116 of the cable gland 100 is configured to provide a sealant for sealing at least spaces between exposed portions of adjacent conductors 108 and/or insulative jackets 110 of the cable 102, and/or for sealing the cable 102 to the cable gland 100, so as to effectively protect internal portions of the device, the cable 102, and/or the outer environment positioned around the device from hazardous environments and/or ingress of debris into the device. Further, the sealing gland 116 is designed and dimensioned to be closely accommodated within the cavity 134 of the gland body 112, within the insert 120, and/or the gland nut 118 when the gland nut 118 is attached to the gland body 112.

The sealing gland 116 includes a bushing body 152 having an inner surface 154 and an outer surface 156. The inner surface 154 generally defines one or more inner bores 158 that are positioned generally in the center of the bushing body 152. The bore(s) 158 is/are sized to accommodate passage of at least a portion of the cable 102 through the bushing body 152. As shown in at least FIGS. 3-5, the outer surface 156 of the bushing body 152, and is sized to accommodate placement of the bushing body 152 within an interior portion of the cable gland 100, including, for example, within the insert 120, the inner aperture 150 of the gland nut 118, and/or the cavity 134 at or around the second open end 124 of the gland body 112. Moreover, at least a portion of the bushing body 152 can be positioned within the a portion of the gland body 112 and/or insert 120 that is, or will be, beneath at least a portion of the gland nut 118 at least when the cable gland 100 is assembled.

The bushing body 152 is constructed of a compressible and/or deformable material, such as, for example, a thermoplastic elastomer or rubber, such that, when the gland nut 118 is tightened onto the second external male thread section 128, at least a portion of the bushing body 152 can be radially compressed against the cable 102, such as, for example, against the outer jacket 106 of the cable 102, and/or exposed portions of the insulative jacket 110 or conductors 108. Further, the bushing body 152 can be constructed from a material that is configured to at least provide an environmental protection against hazardous conditions, such as, for example, weather. For example, referencing the embodiment depicted in at least FIGS. 3 and 4 that includes an insert 120, the insert 120 can include a plurality of arms 162 that are downwardly deflected, deformed, and/or bent against the bushing body 152 when the arms 162 are engaged by an internal surface of the gland nut 118 as an axial position of the gland nut 118 is adjusted via the rotation of the internal female thread 140 of the gland nut 118 about the second external male thread section 128 of the gland body 112. As show, the arms 162 may be separated from adjacent arms 162 by a slot 164, which can aid in the downwardly deflection, deformation, and/or bending of the arms 162 against the bushing body 152.

Figure 5:
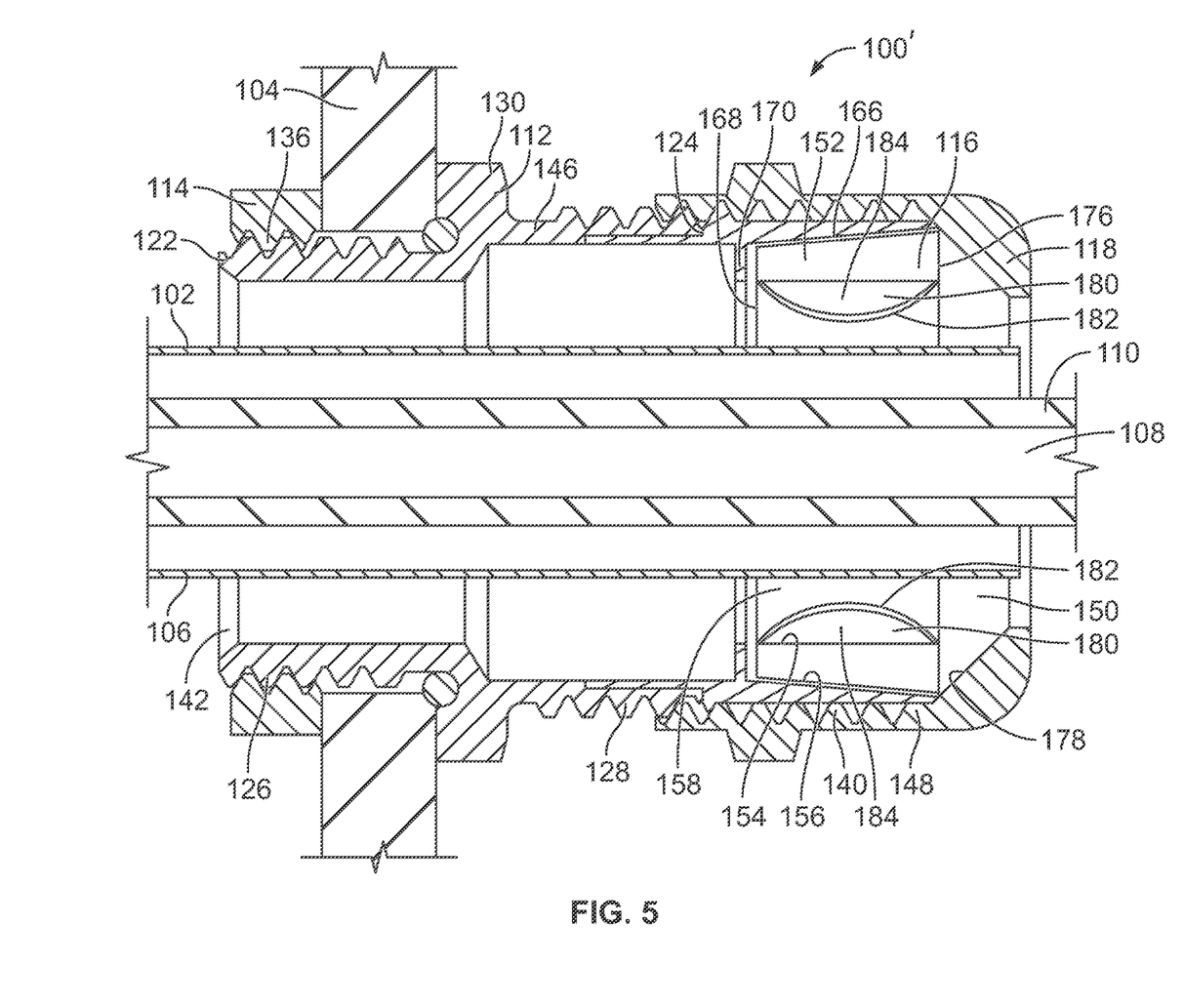
FIG. 5 illustrates a cutaway side view of an embodiment of the exemplary cable gland coupled to a wall of a device.

Alternatively, as shown by the exemplary cable gland 100' shown in FIG. 5, rather than including an insert 120, the outer surface 156 of the bushing body 152 can be linearly displaced along an inwardly tapered surface 166 within the cavity 134 of the gland body 112 by the gland nut 118 as the gland nut 118 is rotated about the second external male thread section 128 in a direction that reduces a distance between the retaining nut 114 and the protruding member 130 of the gland body 112. According to such an embodiment, as the bushing body 152 moves along the inwardly tapered surface 166, and thus moves along a portion of the cavity 134 having a decreasing size, such as a decreasing diameter, radial compressive forces exerted against the outer surface 156 of the bushing body 152 can increase, thereby compressing the bushing body 152 against the cable 102.

According to certain embodiments, in addition to, or in lieu of, being compressed via use of radial forces, the bushing body 152 can also be linearly compressed, such as, for example, via exertion of compressive forces against a sidewall(s) 168, 176 of the bushing body 152. For example, according to certain embodiments, a first sidewall 168 of the bushing body 152 can abut against an inner wall 170 in the cavity 134 of the gland body 112 or an inner wall 172 within an orifice 174 of the insert 120, while a second sidewall 176 can abut against an inner surface 178 of the gland nut 118. According to such embodiments, as the linear distance between the gland nut 118 and the protruding member 130 of the gland body 112 is reduced, such as, for example, via rotation of the gland nut 118 about the second external male thread section 128, the linear distance between the inner surface 178 of the gland nut 118 and the inner wall 170, 172 of the gland body 112 or the insert 120 is reduced in a manner that at least linearly compresses the bushing body 152. Such compression of the bushing body 152 can result in a deformation of the bushing body 152 in a manner in which the inner surface 154 of the bushing body 152 exerts a compressive force against at least a portion of the cable 102.

The sealing gland 116 can also include a sealant 180 that can provide additional environmental protection via forming a seal between at least a portion of the cable gland 100, 100' and the cable 102, as well as a seal in spaces between adjacent conductors 108 and/or adjacent insulative jackets 110 of the cable 102. For example, according to certain embodiments, the sealant 180 can be a releasable, and curable, viscous sealant that is, and least prior to rupturing, contained at least partially within a package 182 of the sealing gland 116. For example, according to certain embodiments, the sealing gland 116 includes a pressure sensitive or rupturable package 182 that defines at least a portion of an inner area 184 that can, at least temporarily, house a portion of the sealant 180. The package 182 can be constructed from a variety of different materials, including, but not limited to, rubber, plastic, or an elastomer, and can be relatively thin, such as, for example, have a wall thickness of around 0.1 millimeters (mm) to about 1 millimeter (mm). Further, according to certain embodiments, the package 182 can be completely enclosed such that, at least prior to rupture, the sealant 180 is entirely housed within the package 182. Alternatively, according to other embodiments, the package 182 defines only a portion of the inner area 184, with another component of the cable gland 100, 100' defining another portion of the inner area 184. For example, according to certain embodiments, the package 182 can be coupled or attached to the inner surface 154 of the bushing body 152 such that at least a portion of the inner surface 154 of the bushing body 152 assists in retaining the sealant 180 within, or otherwise defines a portion of, the inner area 184, while the remainder of the inner area 184 is surrounded by the package 182.

The package 182 can have a variety of different shapes, including, for example, being cylindrically shaped, and be positioned at a variety of locations relative to at least the bushing body 152. For example, as shown by at least FIGS. 4, 5, and 6A, the package 182 can be positioned within the bore 158, and/or supported by the inner surface 154, of the bushing body 152. Additionally, the package 182 may, or may not, be attached or directly coupled to the bushing body 152. For example, according to certain embodiments, the package 182 and bushing body 152 can be separate components such that the package 182 can be separately inserted into, or removed from, the bushing body 152 or other portion of cable gland 100, 100'. Alternatively, the package 182 can be adhered to, or otherwise part of, the bushing body 152. For example, according to certain embodiments, the package 182 can be secured to the bushing body 152 via an adhesive, among other materials, or may be formed with the bushing body 152, such as, for example, during a multi-shot injection molding process.

Figure 4:
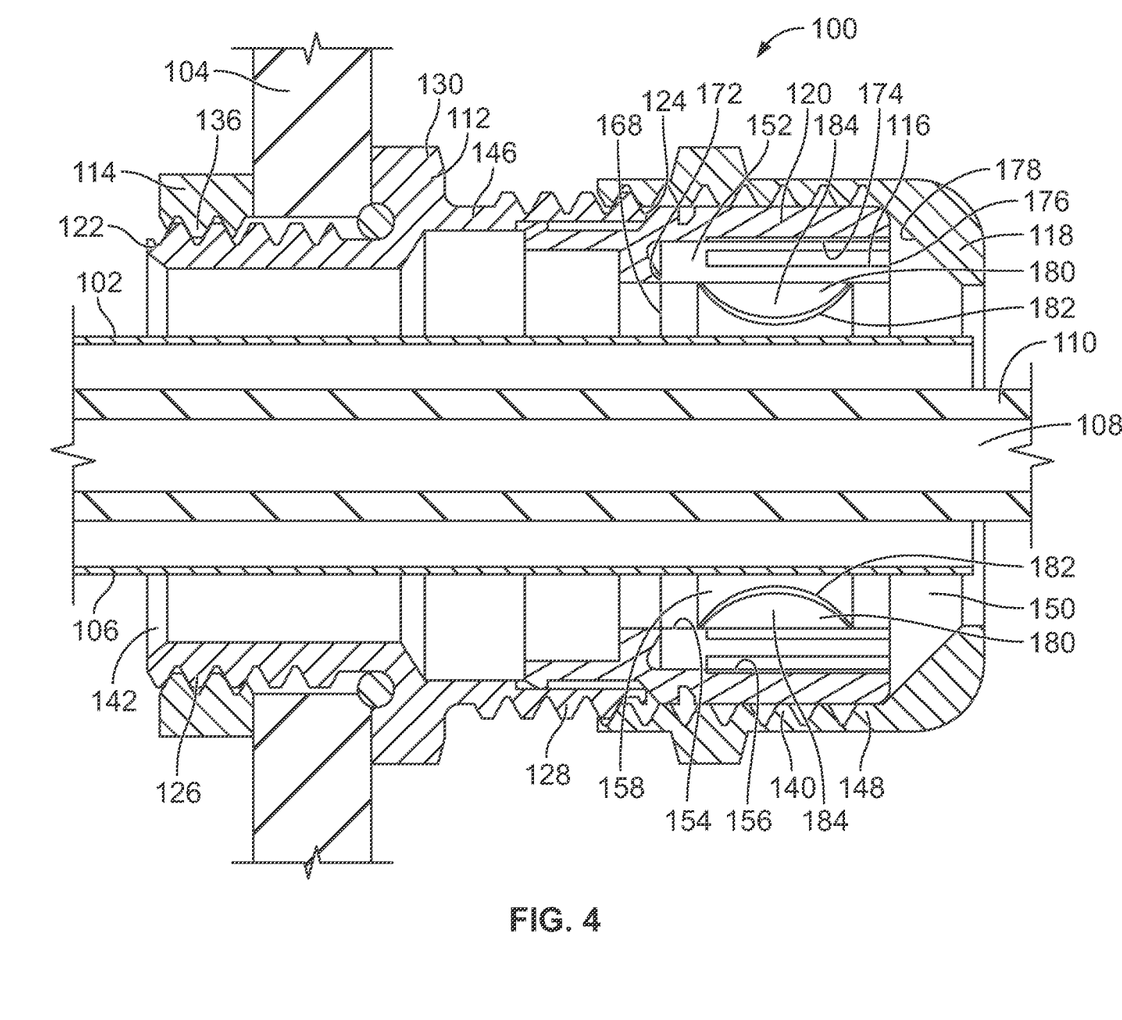
FIG. 4 illustrates a cutaway side view of the embodiment of the exemplary cable gland shown in FIG. 3 attached to the wall of a device.
Figures 6A, 6B:
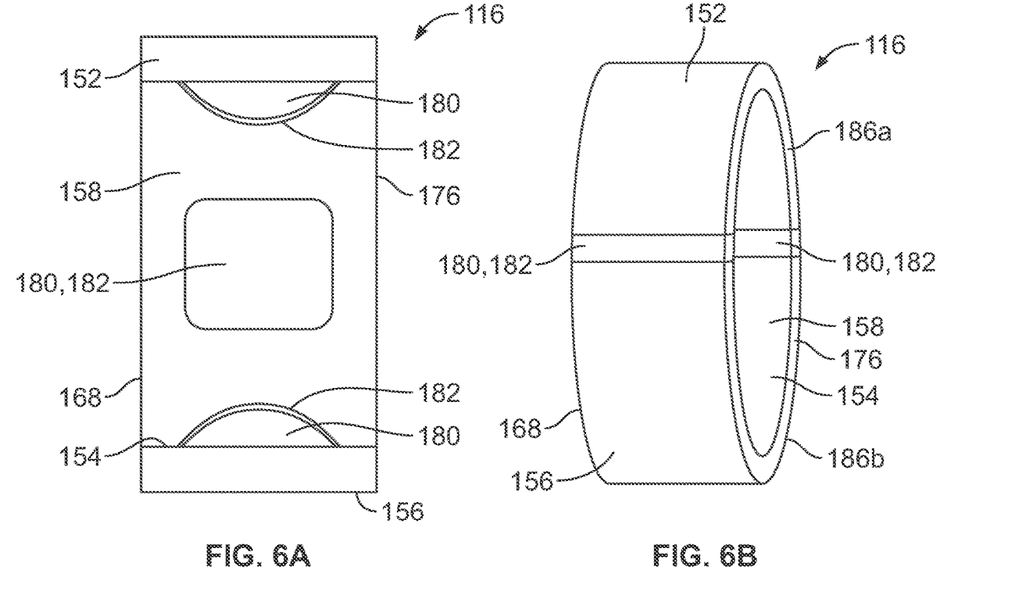
FIG. 6A illustrates an embodiment of a sealing gland having a bushing body and one or more radially positioned internal sealant containing packages.
FIG. 6B illustrates an embodiment of a sealing gland having one or more sealant containing packages integrated into a bushing body of the sealing gland.
Figure 6C:
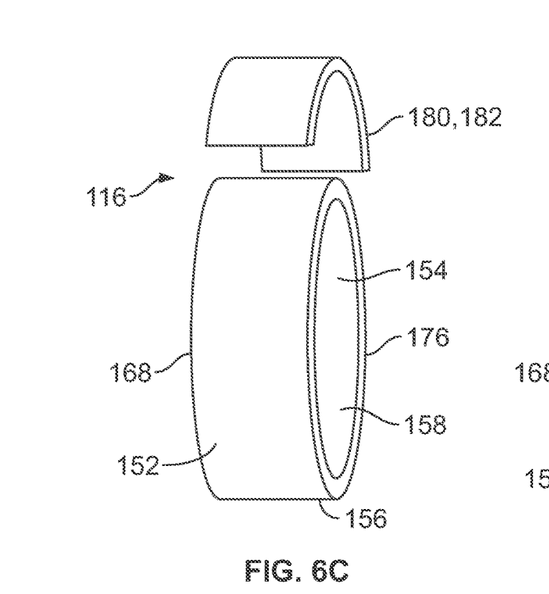
FIG. 6C illustrates an embodiment of a sealing gland having a bushing body and a radially positioned sealant-containing package.
Figure 6D:
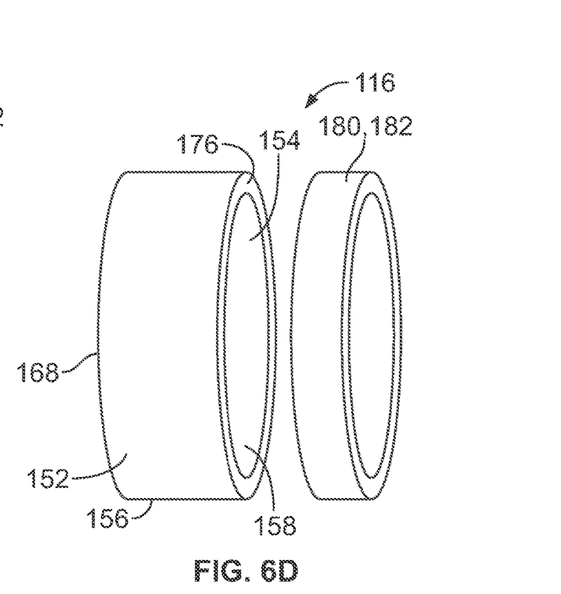
FIG. 6D illustrates an embodiment of a sealing gland having a bushing body and an axially positioned sealant-containing package.

While FIGS. 4 and 5 depict a package 182 having a generally cylindrical shape that is positioned within a bore 158 of the bushing body 152 that may, or may not, be directly attached or coupled to the bushing body 152, FIG. 6A illustrates an embodiment in which the package 182 comprises a plurality of packages 182 that are attached to, or positioned adjacent to, an inner surface 154 the bushing body 152. Alternatively, or in addition to the location of the package(s) 154 shown in FIGS. 4-6A, the package 182 can comprise a package(s) 182 that is/are positioned against or adjacent to one or more sidewalls 168, 176 of the bushing body 152 (FIG. 6C), the outer surface 156 of the bushing body 152 (FIG. 6D), and/or any combination thereof. Further, while FIG. 6C illustrates a package 182 that is configured to be positioned about an upper portion of the outer surface 156 of the bushing body 152, the package 182 could also, for example, be positioned at other locations about the outer surface 156, and can include a plurality of packages 182 that can be at a variety of locations about the outer surface 156, and/or be a continuous package 182 that encircles the outer surface 156. Similarly, while FIG. 6D illustrates a single package 182 adjacent to one sidewall 176 of the bushing body 152, the package 182 (or an additional package 182) could be positioned adjacent to the other sidewall 168, and/or can comprise a plurality of packages 182 about one or both of the sidewalls 168, 176 of the bushing body 152.

FIG. 6B illustrates another embodiment in which, in addition to, or in lieu of, the previously discussed package 182 locations, one or more packages 182 can be integrated or otherwise formed into the bushing body 152, such as, for example, positioned between opposing first and second portions 186a, 186b of the bushing body 152. According to such an embodiment, radial compression on one or both of the first and second portions 186a, 186b of the bushing body 152 can rupture the package 182, thereby releasing the sealant 180. With the sealant 180 released, opposing ends of the first and second portions 186a, 186b of the bushing body 152 that had been separated by the sealant 180 can move into closer proximity to each other, including, for example, into an abutting engagement.

A variety of different sealants can be used for the sealant 180 of the sealing gland 116, including sealants having a variety of viscosities, and sealants that are, or are not, premixed with other components of the sealant. Additionally, at least certain types of sealant 180 may require a period of time to cure. Examples of curable sealants suitable for use as the sealant 180 include, but are not limited to, silicone based compounds liquid based rubbers, and epoxies, among others. Additionally, according to certain embodiments, the packages 182 can contain different sealants 180 or different portions of the sealant 180, including, for example, a solvent in one or more packages 182 and a bonding agent in another package(s) 182. Alternatively, according to certain embodiments, the sealant 180 can be a malleable material, including, but not limited to, a putty. According to such embodiments, the sealant 180 can be positioned at locations similar to those discussed above with respect to the package 182 (as shown in FIGS. 4-6D), and may, or may not, be contained within a package(s) 182.

According to embodiments in which the sealant 180 is contained within the package 182, upon compression of at least the bushing body 152 and/or the package 182, the package 182 can burst or otherwise rupture such that the sealant 180 can be released from the package 182. For example, upon tightening of the gland nut 118 onto the gland body 112 and compressing the cable 102 placed therewithin, compression relating to the arms 162 of the insert 120, radial forces from movement of the bushing body 152 and/or package 182 along the tapered inner surface 166 of the gland body 112, and or axial compression, can result in the sealant 180 being released from the package 182. The released sealant 180 can then flow between the cable 102 and adjacent portions of the cable gland 100, 100', including, for example, the bushing body 152 and/or gland nut 118, as well as flow into spaces between adjacent conductors 108 and/or insulative jackets 110. Thus, the curable and viscous sealant 180 can provide a seal not only between the sealing gland 116 and the cable 102, but also within the cable interstitial spaces. Such a configuration is particularly advantageous where the cable 102 includes multiple conductors 108 with interstitial spaces between the conductors 108.

Alternatively, according to embodiments in which the sealant 180 is a malleable sealant material that may, or may not, be contained in a package 182, the above-discussed such compression, including compression of at least the bushing body 152, can result in forces that press, squeeze, deform and/or displace at least portions of the sealant 180. Moreover, similar to sealant 180 that is curable sealant, as discussed above, the forces associated with compression of the bushing body 152 can force the malleable sealant material into locations that result in the malleable sealant material providing a seal between the sealing gland 116 and the cable 102, as well as presses or pushes the malleable material into spaces between exposed portions of the insulative jackets 110 and/or conductors 108 of the cable 102.

Referencing FIG. 1, during installation, the gland body 112 can first be inserted through the opening 138 defined in the wall 104 or structure of the device until the protruding member 130 of the gland body 112 meets a side 132b of the wall 104. For example, in the illustrated embodiment, the gland body 112 is inserted into the wall 104 such that the first open end 122 of the gland body 112 protrudes from the opening 138 at the first, or left side 132a of the wall 104, and the second open end 124 of the gland body 112 is positioned outside of, or protrudes through the opening 138 to, the right, or second side 132b of the wall 104. The retaining nut 114 can then be attached to the gland body 112 by engaging the internal threads 136 of the retaining nut 114 with the first external male thread section 126 at the first open end 122 of the gland body 112, and rotating the retaining nut 114 towards the wall 104 until the retaining nut 114 tightly engages the wall 104. With the sealing gland 116 positioned within either the gland body 112, the insert 120 that is at least partially secured within the gland body 112, or the gland nut 118, the gland nut 118 is attached to the gland body 112 by engaging the internal threads of the gland nut 118 with the second external male thread section 128 at the second open end 124 of the gland body 112. The gland nut 118 then is rotated such that the gland nut 118 is at least linearly displaced towards the protruding member 130 of the gland body 112. During such displacement of the gland nut 118, the sealing gland 116 is compressed such that the package 182 ruptures or bursts, thereby releasing the sealant 180, and/or the sealant 180 is pressed, such that the sealant 180 is positioned to form a seal between the cable 102 and the cable gland 100, 100', as well as in interstitial spaces between the conductors 108 and/or insulative jackets 110. The gland nut 118 can continue to be rotated until the gland nut 118 tightly engages the gland body 112 and/or the protruding member 130.

Accordingly, as stated above, the cable gland 100, 100' is configured to provide strain relief to the cable 102. Further, this strain relief can provide both sealing and retention to the conductors 108 that run through the wall 104 or structure of a device. Further, from the foregoing, it will be appreciated that a cable gland 100, 100' according to the present application can include a curable or malleable sealant material that may, or may not, be at least temporarily retained in a rupturable package 182 within the cable gland 100, 100' that can provide a sealing for at least environmental protection.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A cable gland comprising:
   a gland body having a cavity;
   a retaining nut configured to be selectively coupled to a first end of the gland body;
   a gland nut configured to be selectively coupled to a second end of the gland body; and
   a sealing gland comprising a bushing body and a sealant, the bushing body having a bore that is in fluid communication with the cavity, the bushing body being configured to be in a compressed state by a coupling of the gland nut to the gland body, wherein the sealant is configured for displacement into a portion of the bore upon the bushing body being in the compressed state.

2. The cable gland of claim 1, wherein the sealing gland further comprises a package, the package defining at least a portion of an inner area that retains the sealant prior to the bushing body being in the compressed state, wherein the package is configured to rupture upon the bushing body being in the compressed state.

3. The cable gland of claim 2, wherein the sealant within the inner area of the package comprises a curable sealant material.

4. The cable gland of claim 2, wherein the package is attached to the bushing body.

5. The cable gland of claim 2, wherein the package comprises a plurality of packages.

6. The cable gland of claim 5, wherein at least one of the plurality of packages contains a different sealant or a different component of the sealant than at least one other package of the plurality of packages.

7. The cable gland of claim 1, wherein the sealant is a malleable sealant material.

8. The cable gland of claim 7, wherein the sealing gland further comprises a package, the package defining at least a portion of an inner area that retains the malleable sealant material prior to the bushing body being in the compressed state, wherein the package is configured to rupture upon the bushing body being in the compressed state.

9. The cable gland of claim 1, wherein prior to the bushing body being in the compressed state, at least a portion of the sealant is positioned within the bore of the bushing body.

10. The cable gland of claim 1, wherein prior to the bushing body being in the compressed state, at least a portion of the sealant is positioned adjacent to at least one sidewall of the bushing body.

11. The cable gland of claim 1, wherein prior to the bushing body being in the compressed state, at least a portion of the sealant is positioned adjacent to at least a portion of an outer surface of the bushing body.

12. The cable gland of claim 1, wherein, at least prior to the bushing body being in the compressed state, at least a portion of the sealant is integrated into the bushing body.

13. A cable gland comprising:
   a gland body having a cavity that extends between openings at opposing ends of the gland body;
   a retaining nut configured for a threaded engagement with a first end of the gland body;
   a gland nut configured for a threaded engagement with a second end of the gland body; and
   a sealing gland comprising a bushing body, a package, and a sealant, the bushing body having a bore that is in fluid communication with the cavity, the sealant being at least temporarily contained within at least a portion of the package, the package configured to rupture upon compression of the bushing body.

14. The cable gland of claim 13, wherein the sealant contained in the package comprises a curable sealant material.

15. The cable gland of claim 14, wherein the package is attached to the bushing body.

16. The cable gland of claim 13, wherein the package comprises a plurality of packages.

17. The cable gland of claim 13, wherein the package is positioned within the bore of the bushing body.

18. A cable gland comprising:
   a gland body having a wall that defines a cavity that extends between openings at opposing ends of the gland body, the wall including a first male thread at a first end of the gland body and a second male thread at a second end of the gland body, the gland body further comprising a protruding member that outwardly extends from the wall at a midsection of the gland body, the protruding member having a shape configured for mating engagement with a tool;
   a retaining nut having an internal thread configured for a threaded engagement with the first male thread of the gland body, the retaining nut having an outer a shape configured for mating engagement with a tool;
   a gland nut having an inner thread configured for a threaded engagement with the second male thread of the gland body, the gland nut having an outer a shape configured for mating engagement with a tool; and
   a sealing gland comprising a bushing body, a package, and a sealant, the bushing body having a bore that is in fluid communication with the cavity of the gland body, the sealant being at least temporarily contained within at least a portion of the package, the package configured to rupture upon compression of the bushing body.

19. The cable gland of claim 18, wherein the sealant contained in the package comprises a curable sealant material.

20. The cable gland of claim 18, wherein the package is positioned within the bore of the bushing body.

* * * * *